United States Patent [19]

Sengupta et al.

[11] Patent Number: 5,355,372
[45] Date of Patent: Oct. 11, 1994

[54] THRESHOLD-BASED LOAD BALANCING IN ATM SWITCHES WITH PARALLEL SWITCH PLANES RELATED APPLICATIONS

[75] Inventors: Bhaskar Sengupta, Princeton Junction, N.J.; Shyamal Chowdhury, Durham, N.C.

[73] Assignee: NEC USA, Inc., Princeton, N.J.

[21] Appl. No.: 107,542

[22] Filed: Aug. 17, 1993

Related U.S. Application Data

[63] Continuation-in-part of Ser. No. 931,847, Aug. 19, 1992, abandoned.

[51] Int. Cl.$^5$ .................. H04L 12/50; H04L 12/54
[52] U.S. Cl. ............................ 370/60.1; 370/61; 370/63; 370/67
[58] Field of Search ............... 370/16, 58.1, 60, 61, 370/63, 67, 68, 108, 60.1

[56] References Cited

U.S. PATENT DOCUMENTS

| | | | |
|---|---|---|---|
| 4,545,051 | 10/1985 | Belforte et al. | 370/63 |
| 4,701,907 | 10/1987 | Collins | 370/63 |
| 5,191,578 | 3/1993 | Lee | 370/63 |

OTHER PUBLICATIONS

Suzuki et al. "Output Buffer Switch Architecture for Asynchronous Transfer Mode" IEEE Conference on Communications. Jun. 11–14, 1989 pp. 250–154.

Aramaki et al "Parallel ATOM Switch Architecture for High Speed ATM Networks", IEEE International Conference on Communications 1992, Chicago, Ill. pp. 311.1.1–311.1.5.

*Primary Examiner*—Benedict V. Safourek
*Attorney, Agent, or Firm*—Arthur J. Torsiglieri

[57] ABSTRACT

An asynchronous transfer mode switching system uses a parallel array of switching planes, distributors for distributing cells between the switching planes, and resequencers for collecting the cells after they have been switched. To balance the loads in the output buffers of the switching planes, each distributor includes two one-cell buffers and a load matrix. The load matrix stores the state of the output buffers in the switching planes, and this information is used to decide whether to send a cell arriving at the first of the one-cell buffers to its scheduled switching plane or to store the cell in the other of the one-cell buffers until either a switching plane with a lightly loaded output buffer for the cell's destination becomes available or another later arriving cell needs to be stored there.

8 Claims, 5 Drawing Sheets

THRESHOLD-BASED LOAD BALANCING IN ATM SWITCHES WITH PARALLEL SWITCH PLANES RELATED APPLICATIONS

FIELD OF THE INVENTION

This is a continuation-in-part of our application Ser. No. 07/931,847 filed Aug. 19, 1992, now abandoned.

BACKGROUND OF THE INVENTION

Advances in high speed VLSI circuits and optical transmission are making available broadband communication systems, such as broadband integrated services digital networks, B-ISDN. With regard to multiplexing and switching, the asynchronous transfer mode (ATM) is becoming a key technology for accommodating a wide range of services in B-ISDN. ATM switching is well adapted to transfer all kinds of digital information signals, using fixed-length cells (short packets) and asynchronous multiplexing. A cell consists of 53 octets (424 bits).

An ATM switch can be built using the ATOM (ATM output Buffer Modular) switch element. The ATOM switch element has an output-buffer architecture. The ATOM switch element uses a Lime-division multiplexed bus and first-in first-out (FIFO) buffers one for each individual output line. Since buffering is provided for outgoing lines, the switch architecture is called an output-buffer architecture.

The ATOM switch element is described in detail in the Proceedings of the IEEE Communications Society, "IEEE International Conference or Communications," pps 99–103, that was held on Jun. 11–14, 1989, as a paper entitled "Output-buffer Switch Architecture for Asynchronous Transfer Mode" by H. Suzuki, H. Nagano, T. Suzuki, T. Takeuchi, and S. Iwasaki.

For the very high speed systems that will be needed in the future, it is expected that it will be necessary to utilize a switch architecture that employs a number of such ATOM switch elements in parallel to handle multi-gigabits per second transmission speeds. In such a system, there need be included a number of distributors, a number of switch planes, and a number of resequencers.

However, in such a system involving a number of parallel switch planes there is a tendency for load unbalances to develop. That is, often some output buffers have to store a large number of cells while others have to store a small number of cells. This scenario leads to a large number of cell losses. If cell loss is to be kept low when the traffic peaks at particular switch planes, then considerable capacity must be provided in the output buffers, capacity that ay not be needed much of the time. To improve the performance of the system, it is desirable to make some provision for balancing the load better to minimize the total buffer capacity needed to be provided in the switch.

The present invention seeks to achieve a more uniform distribution of the load across all the switch planes of the system in order to keep the total number of cell loss to an acceptable level.

SUMMARY OF THE INVENTION

To this end, the invention relates to a switching system that utilizes a plurality of parallel switching planes, each of which consists of an ATOM switch element or its equivalent having an output buffer architecture. A plurality of distributors are used to assign input signals cyclically to the switching planes. A plurality of resequencers are needed to collect the switched signals from the output buffers for transmission to their destinations.

Each output buffer of a switch plane is considered to be in one of two states, a lightly loaded state and a heavily loaded state, depending on whether the number of cells currently stored in the buffer is above or below a prescribed threshold that is a large fraction of the capacity of the buffer. Each distributor in the system is provided with a load matrix, each element of which gives the state of a particular output buffer in the system and can take one of two values:0 and 1. Preferably, the value 0 represents a lightly loaded buffer and the value 1 represents a heavily loaded buffer. A matrix element is set by a switch plane and read by the distributor.

A bit representing the state of each output buffer is fed back to the load matrix of each distributor by the switch planes. Advantageously the feed-back is provided only when there is a change in state of the output buffer.

After an output buffer assumes a heavily-loaded state, the distributor tends to divert new cells away from a switch )lane having such a heavily loaded output buffer in favor of a switch plane having a lightly-loaded output buffer. This balancing advantageously is accomplished as follows. Each distributor has two finite buffers, advantageously of size 1. One of the two buffers is for receiving a newly arrived cell, the other is used for load balancing. The decision to send a newly arrived cell to a switch plane or to store it in such other buffer for load balancing is decided by an appropriate algorithm, executed by a suitable circuit.

In many cases after a cell is held for load balancing for a while, a lightly loaded output buffer corresponding to a desired destination is found in a switch plane to which the cell is then sent. Thus, the number of cells lost in the switch is reduced by the load balancing scheme.

The invention will be better understood from the following more detailed description taken with the accompanying drawing.

DETAILED DESCRIPTION OF THE INVENTION

Figure 1:
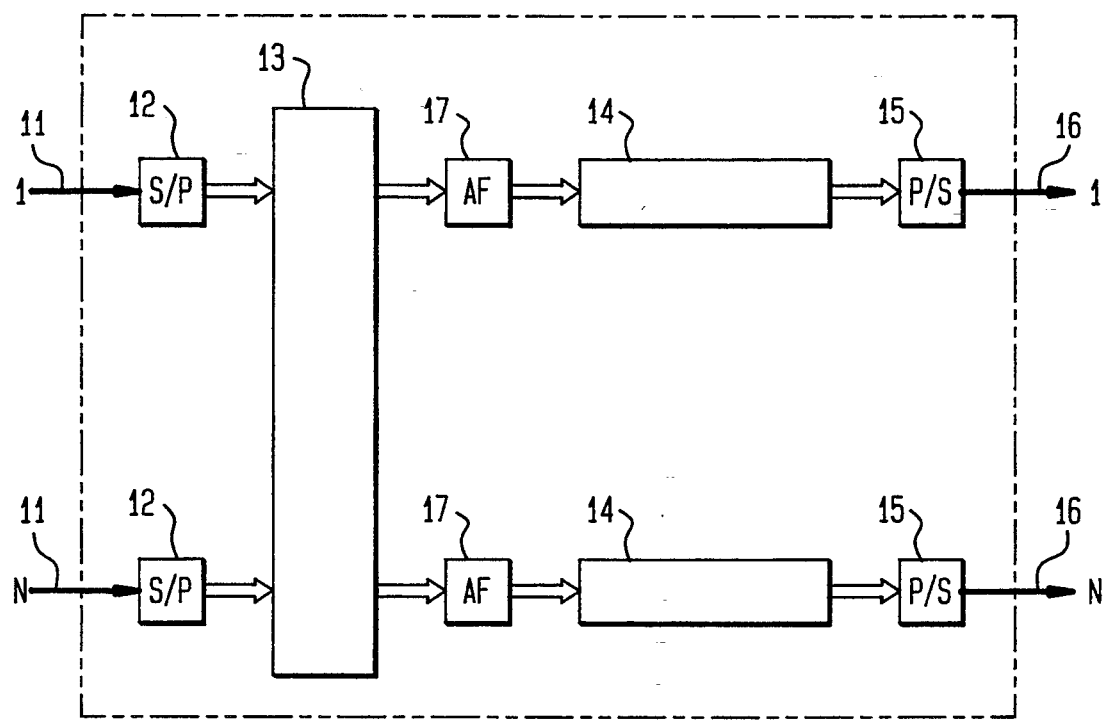
FIG. 1 shows the basic structure of an ATOM switch plane.

FIG. 1 shows the basic structure of an ATOM switch clement 10 of the type used in the present invention.

The, switch element has N input lines 11 and N output lines 16. Each input and output line runs at a speed of V bits/second. For the operation of the switch element, time is assumed to be divided into equal intervals called slots. Ill a slot exactly one cell is transmitted along an input line to the ATOM switch clement. In one time slot each of the N input lines can be used to transmit one cell to the switch clement. Thus, a maximum of N cells can be received by a switch clement in a time slot. In typical operation, some input lines remain idle during a time slot. That is, no cell is transmitted to the switch clement during the slot along the input lines. Consequently, in a time slot the total number of cells received by a switch element from all the input lines varies between 0 and N.

Each cell is routed by the switch to an output line in accordance with the address information included in the cells. To this end, the input cells are each first supplied to a serial-to-parallel converter 12 to convert the serial pulses of each cell into a parallel set of pulses for application to the time-division bus 13. If the time-division bus has L parallel lines, then it runs at a speed of NV/L. This makes it possible to transmit N cells across the bus in a time slot. The time-division bus supplies the pulses by way of address filters 17 towards the output buffer appropriate for the address included in the cell. Since in one time slot, we can have multiple cells addressed to the same output line, the pulses often cannot be transmitted immediately but are first stored in output buffers 14, generally memories of the first-in first-out form (fifo). After the pulses leave the output buffers, they are reformulated into a serial train for transmission by the parallel-to- serial converters 15 associated with the separate output lines 16.

For very high speed networking the cell transfer between the input lines 11 and the buffer memories 14 needs to be done at very high speeds. The use of the serial-to-parallel conversion reduces the required bus speed essentially by the degree of parallelism. However, the amount of parallelism that can practically be used is limited by the length of each cell and so this imposes a limit on the input line speed that can be obtained in such a switch.

To overcome this limitation, there was devised an ATM switch architecture consisting of multiple ATOM switch planes, distributors to distribute cells between such planes for switching, and resequencers to collect the cells after switching for further transmission to their assigned destination.

Figure 2:
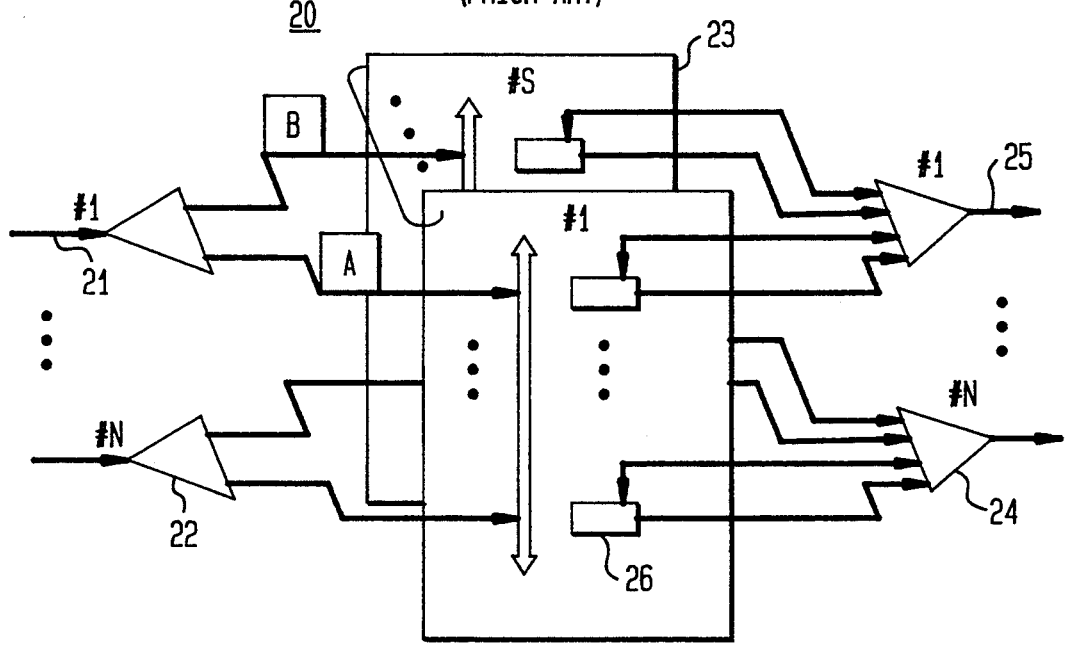
FIG. 2 shows the basic structure of a switch including a number of ATOM switch planes in parallel.

FIG. 2 shows the overall basic structure of an ATM switch 20. This structure is shown and described in detail in the Proc. of IEEE Communications Society, IEEE International Conference on Communications, pps 250–254, June 1992, Chicago, Ill., as a paper entitled "Parallel ATOM Switch Architecture for High Speed ATM Networks". The ATM switch consists of S ATOM switch planes operating in parallel.

Basically, the switch 20 includes N input lines 21 each supplying a train of cells that are to be redirected by the switch. Each input line 21 supplies a separate distributor 22. Also included are a parallel array of S ATOM switch planes 23, each formed by an ATOM switch element shown in FIG. 1. Each distributor 22 in turn demultiplexes cells to each of the switch planes 23. Cells are then transferred to the output buffer memories 26 appropriate to their destination in each switch plane independently of one another. Resequencers 24 control the cell delivery from the output buffers 26 to the output lines 25 in order to keep the cell sequence integrity.

In such a switch it is convenient to think of each distributor as operating in cycles of length S time units. The cycles are numbered 1, 2, 3, . . . If cycle k begins at time x, then at time $x+i-1, 1 \leq i \leq S$, the distributor for input j, $1 \leq j \leq N$, would send a cell to switch plane i if a cell is available at input j. Switch plane i does not receive any cell from the distributors at any other time during cycle k. A cell is distributed immediately after its arrival at the input. Thus, at each distributor the cells are distributed FCFS regardless of the destination. The switch planes are scheduled to receive cells hi a cyclic round-robin manner. Whether the planes actually receive cells in a round-robin manner depends on the availability cells for distribution. If we have a newly arrived coil ill every slot then the switch planes will receive cells in a round-robin manner. However, in reality there will be no cell arrivals in some slots. For this reason, the switch planes do not receive cells in a strictly round-robin manner. So, we say that the switch planes receive cells in a quasi-round-robin (QRR) manner. As a consequence, the different output buffers for a given output line need not fill at the same rate, so that some become more loaded than others.

An output buffer of a switch plane receives cells after intervals of length S units (assuming cells are available). The cell arrival process at an output buffer of a switch plane can be described as follows. The arrivals occur in a sequence of cycles numbered 1, 2, 3, . . . Each cycle is of length S time units. If cycle k begins at time x, then at time $x+i-1$ cells arrive at the output buffers of switch plane i. The number of cell arrivals in cycle k at output buffer j of switch plane i is denoted by $A_{kij}$. $0 \leq A_{kij} \leq N$. The set of cells that arrive in cycle k at output buffer j of switch plane i is denoted by $C_{kij}$. The cells in $C_{kij}$ and those in $C_{k,i+1,j}$ arrive at their respective buffers after an interval of one time unit.

Figure 3:
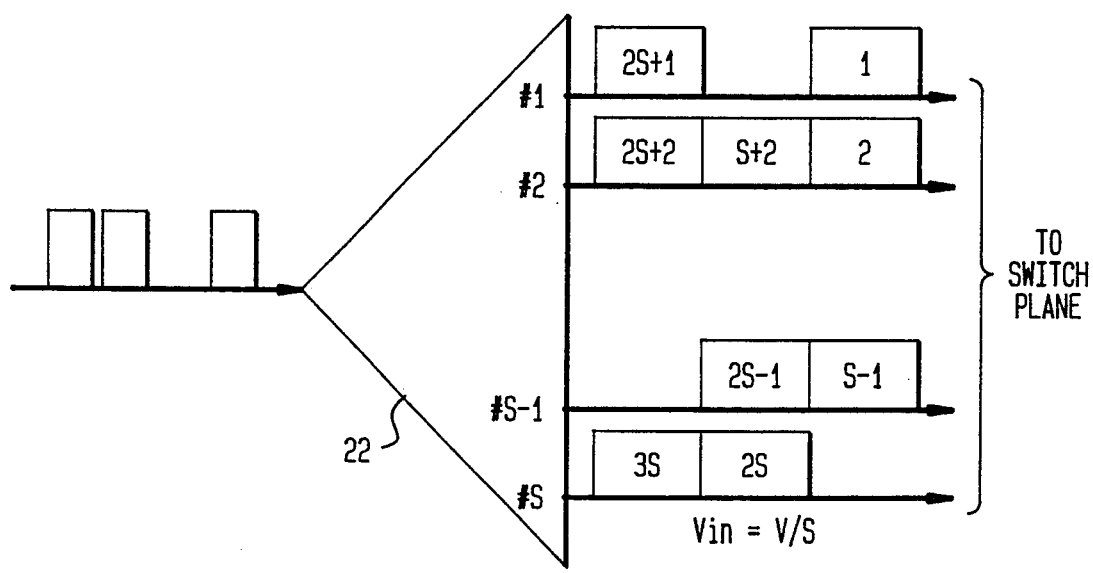
FIG. 3 illustrates the cell distribution operation to the ATOM switch planes.

FIG. 3 illustrates the normal cell distribution operation at each distributor. The distributor demultiplexes cells to each switch plane every S time-slot at the N/S rate. The distributor changes the switch plane to which the incoming cell is to be sent time-slot by time-slot cyclically in a repeated cycle. As seen in the figure, in the first cycle, cells are shown as having been sent to switch planes, 1,2 and S−1, with none to switch plane S, because there was no cell being received by the distributor at its time slot. In the second cycle, no cell was sent to the first switch plane in the first time slot, in the third cycle, cells were sent to each of the three switch planes depicted. Within each switch plane there occurs the serial-to-parallel conversion, the switching to an appropriate buffer, the parallel-to-serial conversion to restore the pulses to the cell format and then the collection of the cells by a resequencer for transmission.

In an ATM switch, the cells in a train of cells in the output line must leave in the same sequence in which the cells at the input line arrived. Since there are multiple switch planes, there are different paths through the switch that an individual cell can travel and different output buffers at which a cell may end up so that cells can get out of sequence. To ensure that the cells in a train leave in the output line in the same sequence with which they arrived in the input line, a resequencing operation needs to be included. To keep the cell sequence integrity at the resequencers, time-stamps whose value is increased on a time-slot by time-slot basis are added to the cells. The various values shown in FIG. 3 are the time stamps that would be appropriate for the example given.

To keep the cell sequence integrity, cell readout is controlled by the resequencers. The cell resequencing operation is designed to insure that the desired destination output line receives the cells in the right sequence. Various resequencing formats have been proposed in the last mentioned paper, which provides more details of such a switching system. In our preferred resequencing operation, the resequencer switches the cell with the minimum time stamp among the cells stored at the head of the buffer memories.

Figure 4A:
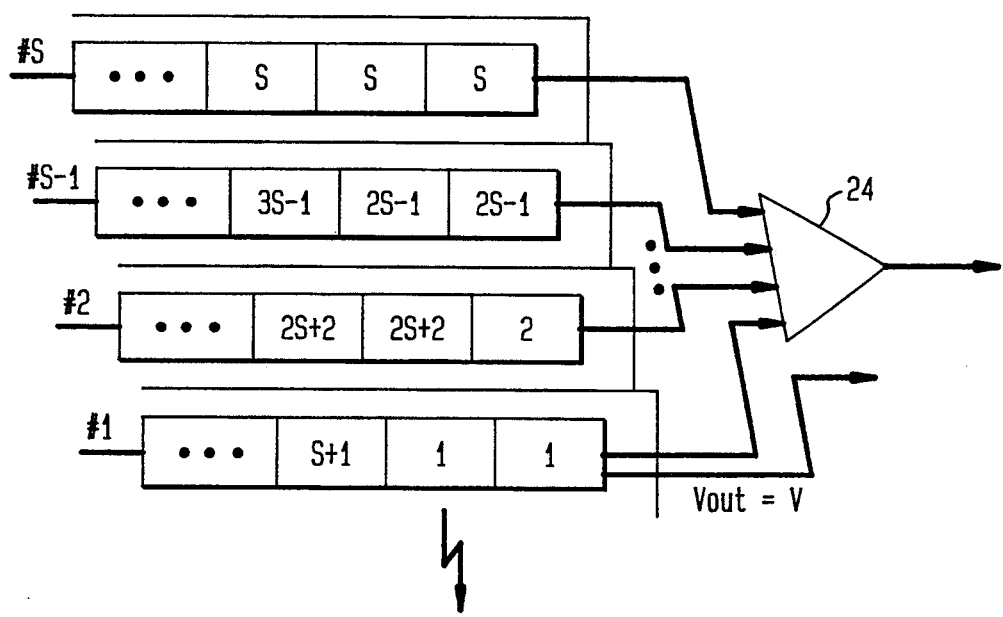
FIG. 4A and FIG. 4B illustrate its resequencing operation.
Figure 4B:
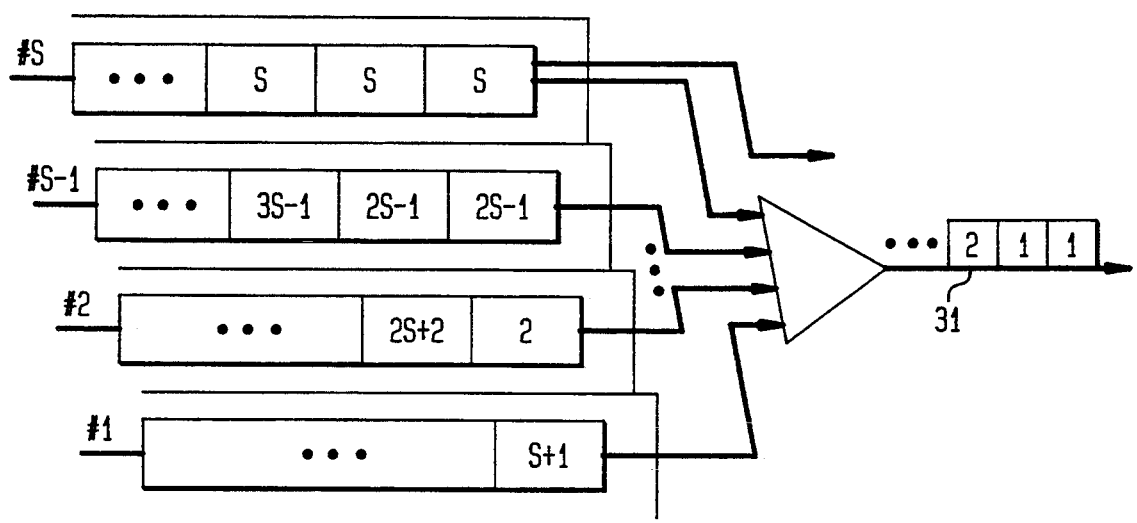

FIGS. 4A and 4B illustrate the resequencing operation. FIG. 4A shows the status of output buffers of four selected switch planes, #1, 2, S-1, S showing the time stamps of the cells at the output end of each buffer corresponding to the same output line. As shown, the output buffer of switch plane #1 includes two cells with time stamp 1. These two cells will be the first to be sent out, after which the cell with time stamp 2 in switch plane #2 would have the lowest time stamp and be the next to go. This is indicated in FIG. 4B by the 1, 1, 2 shown at the output line 31. After these have been sent, the next to be sent would be the three cells with time stamp S shown in switch plane #S.

In this prior art arrangement described up to this point, the distributor shown in FIGS. 2 and 3 does not support load balancing. The current invention involves an improved form of distributor that will support load balancing, and will be explained with the help of FIGS. 5, 6, 7, and 8. In particular, to build an ATM switch that supports load balancing, the distributor in FIGS. 2 and 3 will be replaced by the distributor to be described with reference to FIGS. 5, 7, and 8.

For the purpose of load balancing, each buffer for an output line can be considered to be in one of two states: lightly-loaded slate and heavily- loaded state. A buffer is said to be lightly-loaded if the number of cells in the buffer is less than or equal to a threshold T. A buffer is said to be heavily-loaded if the number of cells in the buffer is greater than the threshold T. Typically, T will be between 80 and 90 per cent of the capacity of a buffer.

Figure 5:
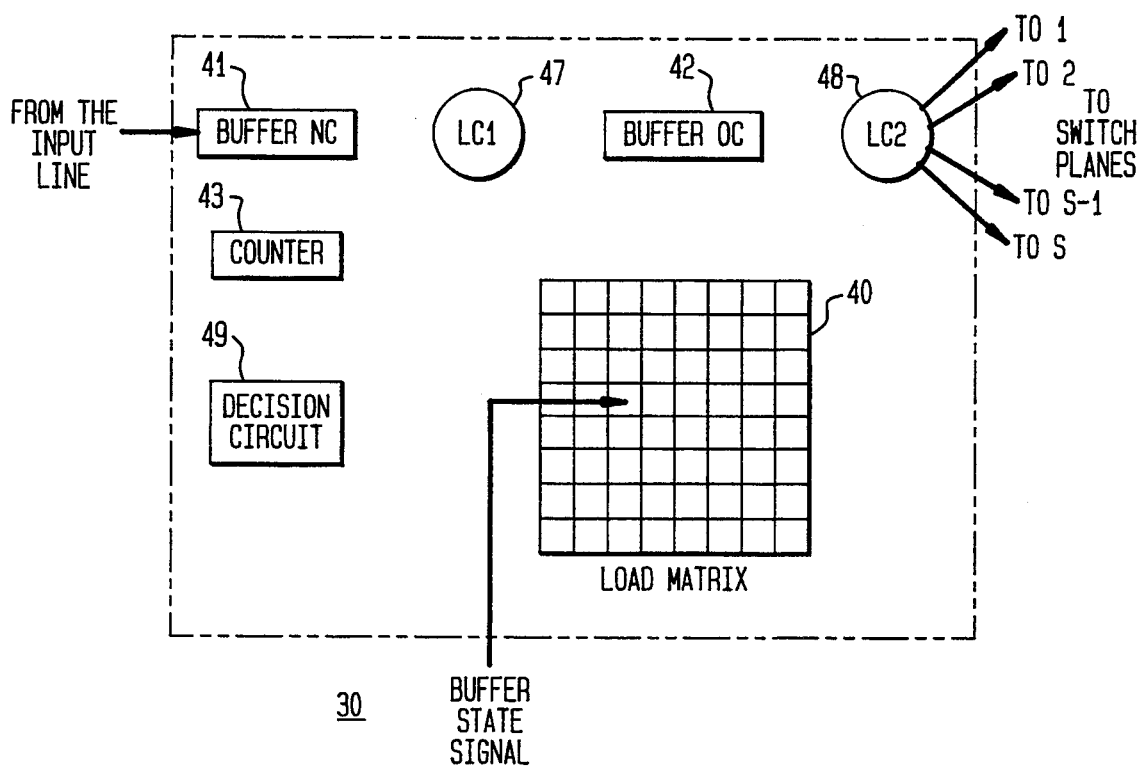
FIG. 5 shows the components of the control means at a distributor in a system.

FIG. 5 shows the components that are included in each distributor for supporting load balancing. The interactions between the components will be explained with reference to FIGS. 7 and 8. As shown in FIG. 5, distributor 30 has seven components: a load matrix 40, a one cell buffer NC 41, a one cell buffer OC 42, a counter 43, a decision circuit 49, a logic circuit LC1 (47), and logic circuit LC2 (48).

Each distributor has a load matrix 40 consisting of a total of $S \times N$ bits corresponding to S rows and N columns. The matrix clement $L_{ij}$ gives the state of the output buffer for line j in switch plane i. The matrix element $L_{ij}$ takes one of two values: 0 and 1. Preferably, the value 0 stands for a lightly-loaded buffer, and the value 1 stands for a heavily-loaded buffer. A matrix element is changed (or written) by a switch element, and used (or read) by the distributor.

A bit representing the state of a buffer is led back to each distributor by the switch elements. This bit is called the buffer state signal. The buffer state signal is provided only when there is a change of state for an output buffer. The method used to generate this signal is explained in FIG. 6.

Each distributor has two finite buffers advantageously each of size 1. One buffer 41 (NC) is for a newly arrived input cell. The buffer NC is directly connected to an input line and receives a cell from the input line in a non-idle slot. The other buffer 42 (OC) is for a, cell which has arrived in an earlier slot but whose distribution to a switch element has been postponed for the purpose of load balancing. There is a counter 43 that gives the number i of the switch plane that is scheduled to receive a cell in the slot under consideration. This counter counts from 0 to S−1. The count is incremented by one in every slot. When the count reaches S=1, in the next slot the count is reset to the value 0. When the counter has the value i−1, switch plane i will receive a cell, if the distributor decides to send a cell to a switch plane in that time slot.

There is a decision circuit 49 that makes a decision about what to do with the cells in the buffers NC and OC. How this decision is made is explained below. An example is of a decision to send the cell in buffer NC to a switch plane and to keep the cell in buffer OC in place. This will be done when in the scheduled switch plane the output buffer corresponding to the cell in NC is lightly loaded, but the output buffer corresponding to the cell in OC is heavily loaded. In this case, the cell in OC has arrived in the distributor before the cell in NC. However, since the cells are directed to different output lines, the fact that they are leaving the distributor out of sequence does not matter. Only cells that have come along the same input line and have the same output line as the destination must be kept in sequence by the switch.

LC 2 (48) provides the circuitry necessary to send a cell ill NC or in OC to a switch plane. Logic circuit LC 1 (47) provides the circuitry necessary to transfer a cell in NC to OC, or to transfer a cell in NC to a switch plane through logic circuit LC 2.

Figure 6:
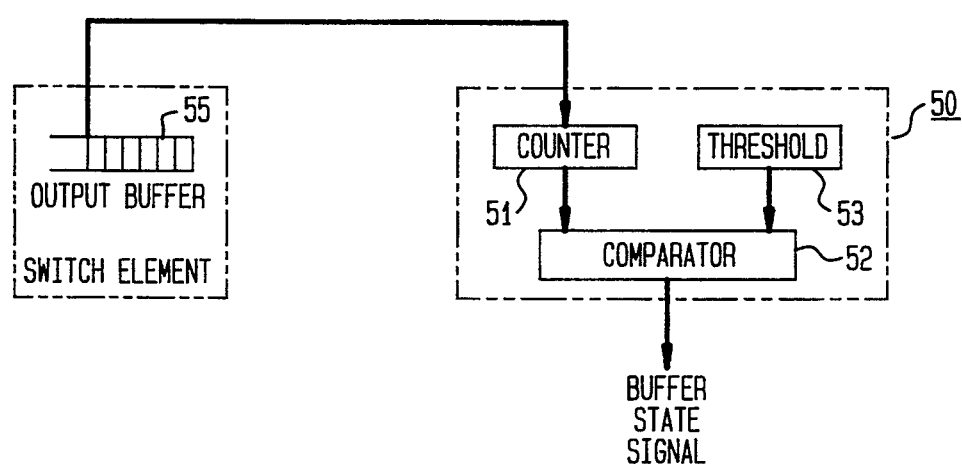
FIG. 6 illustrates the portion of the control means at the output buffer for use with the control means at the distributor shown in FIG. 5.

FIG. 6 depicts a simple circuit 50 that can be used to generate the buffer state signal. Obviously, other forms could be employed. The counter 51 contains the count of the current number of cells in the output buffer 55. The comparator 52 compares the threshold value with the value given by the counter 51. The output of the comparator 52 is 1 if the counter value is greater than T. Otherwise, it is 0. The buffer state signal is sent to the load matrix 40 in the distributors to change the corresponding load matrix clement. This circuit is incorporated in the switch plane. There will be one such circuit for each output buffer in a switch plane. There is also need for a decision circuit 49 to make the cell distribution decision mentioned earlier.

For making a cell distribution decision, the decision circuit 49 makes use of four input signals. Two of the four signals indicate whether NC has a cell or it's empty, and whether OC has a cell or it's empty. The other two signals, denoted by Imn and Imo, give the state of the output buffers in the switch planes corresponding to the cells in the buffers NC and OC. The decision circuit can be simply a circuit that acts as a look-up table to perform the look-up function depicted in Table 1 shown below. Various circuits are available for accomplishing this simple function. In particular, a four-bit microprocessor can be readily programmed to serve this role.

Figure 7:
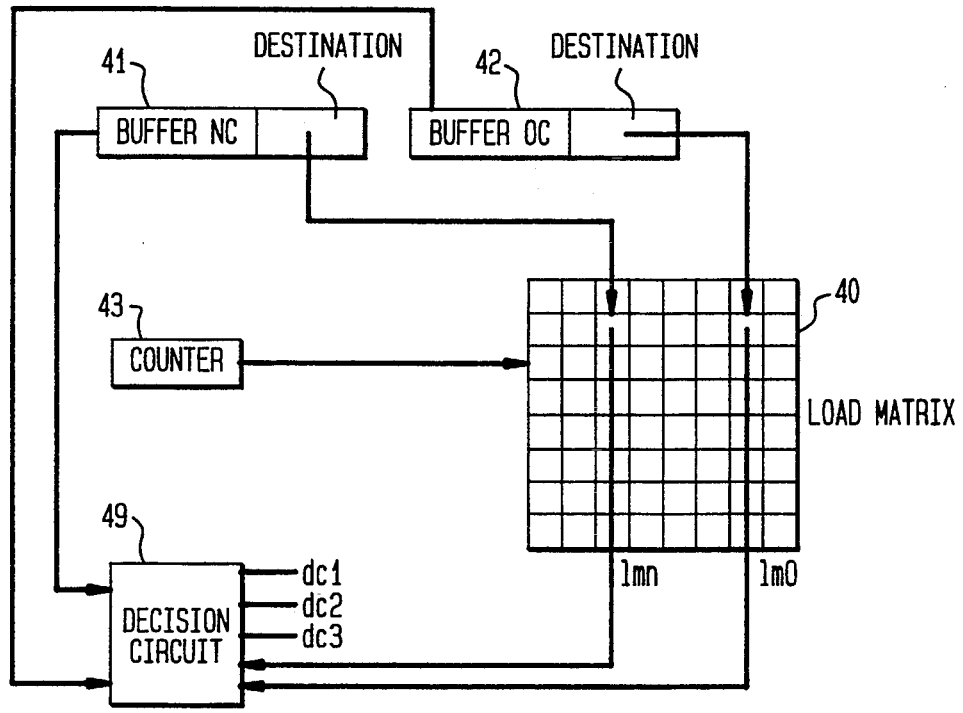
FIG. 7 is a diagram useful in explaining the generation of two control signals in a distributor.

FIG. 7 explains one possible mode of generation of the two signals, Imn and Imo, used by the decision circuit. The signal Imn gives the load matrix entry or state for a newly arrived cell in buffer NC. The signal Imo gives the load matrix entry or state for a cell stored in the buffer OC. To generate these signals, a load matrix row is selected by the counter 43 that gives the number i of the switch plane that is scheduled to receive a cell in the slot under consideration. The destination field of the cell in buffer OC selects a column of the load matrix. The selected load matrix entry is the signal lmn is generated. For simplicity, in FIG. 7 the logic circuits LC 1 and LC 2 have not been shown.

Table 1 shows every possible input signal combination of the decision circuit. Corresponding to given values of the four input signals, the decision circuit triggers a number of possible actions. These actions are coded by three output signals dc1, dc2, and dc3 of the decision circuit. These signals are fed to the logic circuits LC 1 and LC 2. These two circuits are responsible to carry out the intended actions. In Table 1 we show the actions corresponding to given input signals and the values of the decision circuit output signals dc1, dc2, and dc3.

TABLE 1

| | Input Signals | Actions | Output Signals |
|---|---|---|---|
| 1 | NC is empty<br>OC is empty | No Action | dc1=0<br>dc2=0<br>dc3=0 |
| 2 | NC has a cell<br>OC is empty<br>lmn=0 | Cell in NC goes to<br>a switch plane | dc1=1<br>dc2=0<br>dc3=0 |
| 3 | NC has a cell<br>OC is empty<br>lmn=1 | Cell in NC goes to OC | dc1=0<br>dc2=1<br>dc3=0 |
| 4 | NC is empty<br>OC has a cell<br>lmo=0 | Cell in OC goes to<br>a switch plane | dc1=1<br>dc2=1<br>dc3=0 |
| 5 | NC is empty<br>OC has a cell<br>lmo=1 | Cell in OC stays<br>in place | dc1=0<br>dc2=0<br>dc3=1 |
| 6 | NC has a cell<br>OC has a cell<br>lmo=0 | Cell in OC goes to<br>a switch plane;<br>Cell in NC goes to OC | dc1=0<br>dc2=0<br>dc3=1 |
| 7 | NC has a cell<br>OC has a cell<br>lmo=1<br>lmn=0 | Cell in NC goes to<br>a switch plane;<br>Cell in OC stays<br>in place | dc1=1<br>dc2=0<br>dc3=0 |
| 8 | NC has a cell<br>OC has a cell<br>lmo=1<br>lmn=1 | Cell in OC goes to<br>a switch plane;<br>Cell in NC goes to OC | dc1=0<br>dc2=0<br>dc3=1 |

In Row 6 of Table 1, we do not take into consideration the signal lmn although there is a cell in NC. Since lmo is 0, and the cell in OC has arrived in the distributor before the cell in NC, we decide to send the cell in OC to a switch plane, regardless of the value of lmn.

In Row 2 of Table 1, OC, is empty. So the actions in Row 2 and Row 7 are equivalent. Hence the same values have been assigned to the three output signals in the two rows.

Figure 8:
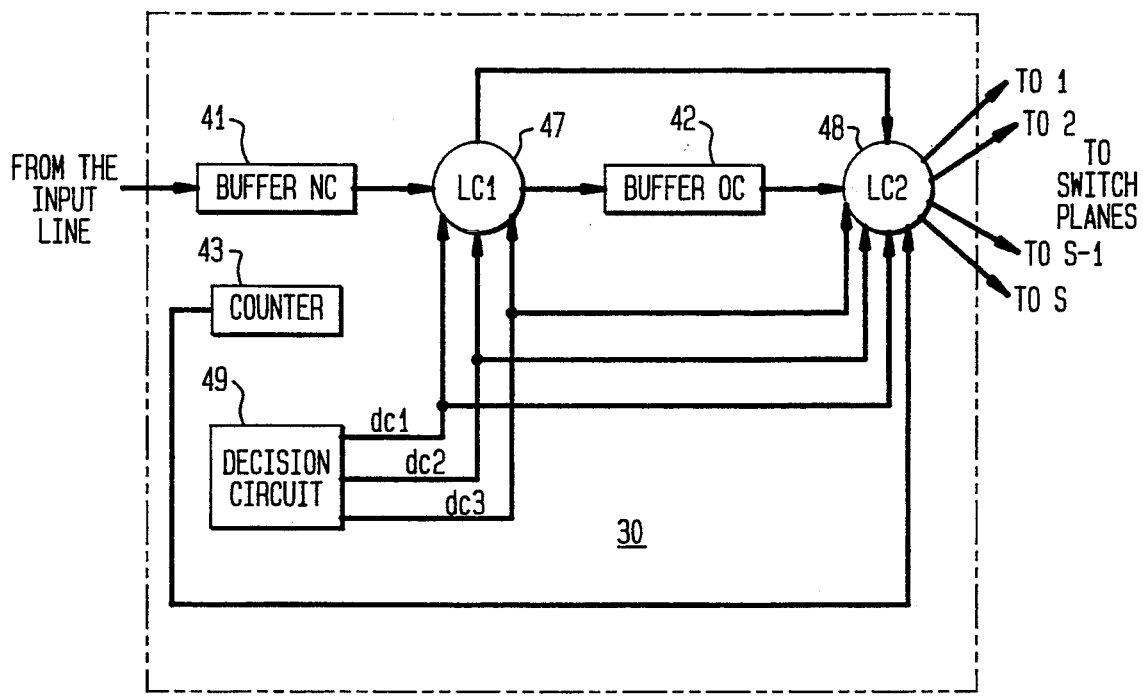
FIG. 8 illustrates the transfer of a cell from one buffer to another in a distributor, and from a distributor to a switch plane.

FIG. 8 illustrates the circuit arrangement for transferring the cells between the components of a distributor 30. The logic circuit LC 1 is controlled by signals dc1, dc2, and dc3, generated by the decision circuit 49. LC 1 has one input, and two outputs. The input of LC 1 is from the buffer NC. One output of LC 1 is an input of LC 2, the other output is the input to Buffer OC. When (dc1=0, dc2=1, dc3=0), or (dc1=0, dc2=0, dc3=1), the input of LC 1 is connected to the output going to buffer OC, and the cell in NC is transferred to OC. When (dc1=1, dc2=0; dc3=0, the input of LC 1 is connected to the output going to LC 2, and the cell in NC is transferred to a switch plane through LC 2. For all other sets of values of dc1, dc2, and dc3 the input of LC 1 is kept disconnected to the two outputs.

The function of logic circuit LC, 2 is to transfer a cell from either buffer NC or buffer OC, to a switch plane. It has S outputs going to the S switch planes. A cell is sent to only one of the S switch planes. The switch plane to which a cell will be sent is determined by the counter 43. The counter value is directly fed into LC 2. LC, 2 is controlled by the three signals dc1, dc2, and dc3. LC 2 has two inputs. One input is from LC 1. This input carries the cell in buffer NC. The other input of LC 2 is from buffer OC. When (dc1=1, dc2=0, dc3=0) the input from LC 1 is connected to an output to a switch plane, and the cell in NC is transferred to a switch plane. When (dc1=1, dc2=1, dc3=0), or (dc1=0, dc2=0, dc3=1), the input from OC is connected to an output to a switch plane, and the cell in OC is transferred to a switch plane. For all other sets of values of dc1, dc2, and dc3 the two inputs of LC 2 are kept disconnected to the S outputs.

It is to be understood that the specific embodiment that has been described is merely illustrative of the general principles of the invention. It should be apparent that various modifications can be made thereto without departing from the spirit and scope of the invention.

We claim:

1. In a switching system that includes a plurality of input lines each of which is to be supplied with a train of cells of signal information, and a plurality of output lines to particular ones of which specific cells of signal information are to be transmitted, a switching assembly between the input lines and the output lines comprising,
   plurality of switching planes, each including a plurality of output buffer means, one for each of the different destinations associated with the output lines,
   a plurality of distributing means, a different distributing for each input line, for distributing cells arriving at such line between the different switching planes,
   resequencing means a different one associated with each output line, for collecting cells from the plurality of the output buffer means associated with such output line,
   means for monitoring the load in each output buffer means and feeding back the load information to all the distributing means, and
   means at each distributing means for receiving the load information and using it to bypass switching planes whose output buffer means corresponding to the output line for the destination of an arrowing cell of signal information has a load in excess of some threshold value.

2. In a switching system in accordance with claim 1, a switching assembly between the input lines and the output lines in which the means at each distributing means for receiving the load information and using it includes means for storing the cell instead of distributing it to the next available switching plane when the output buffer means in such switching plane associated with an arrowing cell's destination is heavily loaded but distributing it later to a different switching plane having a lightly loaded output buffer means.

3. In a switching system in accordance with claim 1, a switching assembly in which each of said switching planes includes a serial-to- parallel converter for converting input serial cells to parallel cells, a time division bus means to which the parallel cells are applied for routing, and parallel-to-serial converting means for converting said parallel cells to serial cells.

4. A switching system in accordance with claim 3 in which the means for storing a cell includes a buffer at the distributing means in which the cell is stored temporarily and is distributed later at the sooner of either another withheld cell being substituted in its place or a lightly loaded buffer for the same destination becoming available at a later empty time slot.

5. A switching system in accordance with claim 1 in which the means at each distributing means for receiving the load information and using it to bypass those switching planes that have an output buffer means whosea load is in excess of a threshold value includes a pair of buffer means to the first of which each arriving cell is first sent and to the second of which a cell that has earlier arrived at said first buffer means is sent for storage i[the arriving cell is destined for a switching plane having an output buffer means whose load is in excess of the threshold value.

6. A switching system according to claim 5 in which the two buffer means at the distributing means are each one-cell buffer means.

7. In an asynchronous transfer mode switching system that has an output buffer architecture and that has a plurality of incoming lines and a plurality of outgoing lines, each for a different destination, between which are included a plurally of switching elements each of which includes a separate output buffer supplying an outgoing line associated with a particular destination, a plurality of distributor means, a separate one being associated with each separate incoming line and comprising a first and a second storage means, each of at least one cell size, the first storage means being connected to an incoming line for receiving and storing temporarily signal cells supplied by said line, and being adapted for transferring said received signal cells selectively either to the second storage means or to a switching element, load matrix means for storing the load status of each load buffer in the switching elements, and decision making means supplied with the load status of the load buffers for selecting whether cells in the first storage means are transferred to a switching element or to the second storage means and for determining when cells in the second storage means are transferred to switching elements.

8. A distributor means in accordance with the distributor means of claim 7 in which the first and second storage means are each of one cell size.

* * * * *

UNITED STATES PATENT AND TRADEMARK OFFICE
CERTIFICATE OF CORRECTION

PATENT NO. : 5,355,372
DATED : October 11, 1994
INVENTOR(S) : Bhaskar Sengupta and Shyamal Chowdhury It is certified that error appears in the above-indentified patent and that said Letters Patent is hereby corrected as shown below:

Column 8, line 41, claim 1, insert a comma after "means"

Column 9, line 18, claim 5, change "i[" to --"if"--

Signed and Sealed this

Seventh Day of February, 1995

Attest:

BRUCE LEHMAN

Attesting Officer

Commissioner of Patents and Trademarks